United States Patent
Arataki et al.

(10) Patent No.: US 7,873,880 B2
(45) Date of Patent: Jan. 18, 2011

(54) DATA RELAY DEVICE, STORAGE DEVICE, AND RESPONSE DELAY MONITORING METHOD

(75) Inventors: Nina Arataki, Kawasaki (JP); Sadayuki Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 11/907,950

(22) Filed: Oct. 18, 2007

(65) Prior Publication Data

US 2008/0155358 A1 Jun. 26, 2008

(30) Foreign Application Priority Data

Dec. 26, 2006 (JP) .............................. 2006-350520

(51) Int. Cl.
*G06F 11/00* (2006.01)
(52) U.S. Cl. .......................................... 714/55; 714/57
(58) Field of Classification Search .................. 714/48, 714/51, 55, 57
See application file for complete search history.

(56) References Cited

U.S. PATENT DOCUMENTS

| | | | |
|---|---|---|---|
| 5,113,504 A * | 5/1992 | Matsuda ....................... 714/23 |
| 5,388,254 A * | 2/1995 | Betz et al. .................... 714/16 |
| 5,398,332 A * | 3/1995 | Komoda et al. ............... 714/55 |
| 5,689,728 A | 11/1997 | Sugimoto et al. |
| 5,758,057 A * | 5/1998 | Baba et al. ..................... 714/7 |
| 6,173,339 B1 * | 1/2001 | Yorimitsu ....................... 710/5 |
| 6,321,345 B1 | 11/2001 | Mann et al. |
| 6,493,772 B1 * | 12/2002 | Hughes ......................... 710/19 |
| 6,735,672 B2 * | 5/2004 | Nishikawa et al. ........... 711/114 |
| 6,782,496 B2 * | 8/2004 | Fleming ........................ 714/55 |
| 6,789,165 B2 * | 9/2004 | Apperley et al. ............. 711/114 |
| 6,857,086 B2 * | 2/2005 | Shaw ............................. 714/55 |
| 7,069,467 B2 * | 6/2006 | Asako ............................ 714/6 |
| 7,139,934 B2 | 11/2006 | Nakagawa et al. |
| 7,389,396 B1 * | 6/2008 | Goel et al. ................... 711/167 |
| 7,428,594 B2 * | 9/2008 | Hashimoto .................. 709/229 |
| 2005/0203908 A1 * | 9/2005 | Lam et al. ..................... 707/10 |
| 2006/0095813 A1 * | 5/2006 | Yagisawa et al. ............. 714/55 |

FOREIGN PATENT DOCUMENTS

| | | |
|---|---|---|
| JP | 2-62623 | 3/1990 |
| JP | 2000-20461 | 1/2000 |
| JP | 2000-330732 | 11/2000 |
| JP | 2001-154732 | 6/2001 |
| JP | 2003-503766 | 1/2003 |

(Continued)

OTHER PUBLICATIONS

Japanese Office Action issued Jan. 30, 2009 in corresponding Japanese Patent Application 2006-350520.

*Primary Examiner*—Joshua A Lohn
(74) *Attorney, Agent, or Firm*—Fujitsu Patent Center (57) ABSTRACT

A data relay device relays a read request from a source device to a destination device and relays data corresponding to the read request from the destination device to the source device. The data relay device monitors elapsed time from a time point at which a read request is relayed to the destination device. When the elapsed time reaches warning time or error time, the data relay device sends a warning message or an error message to the source device.

15 Claims, 9 Drawing Sheets

FOREIGN PATENT DOCUMENTS

| | | |
|---|---|---|
| JP | 2005-50006 | 2/2005 |
| JP | 2005-182104 | 7/2005 |
| JP | 2005-309818 | 11/2005 |
| JP | 2005-326935 | 11/2005 |
| JP | 2006-107151 | 4/2006 |

* cited by examiner

| NUMBER | TAG | ELAPSED TIME | READ FLAG |
|---|---|---|---|
| 0 | 0x01 | 90 | - |
| 1 | 0x05 | 100 | ON |
| ⋮ | | | |
| 31 | 0x03 | 322 | - |

FIG.5

| NUMBER | TAG | ADDRESS | RESPONSE TIME | RESPONSE FLAG | TYPE OF DELAY |
|---|---|---|---|---|---|
| 0 | 0x00 | 0x10000_1000C | 900 | ON | E |
| 1 | 0x09 | 0x10000_10010 | 65535 | - | E |
| ⋮ | | | | | |
| 63 | 0x02 | 0x10000_10200 | 600 | ON | W |

DATA RELAY DEVICE, STORAGE DEVICE, AND RESPONSE DELAY MONITORING METHOD

BACKGROUND OF THE INVENTION

1. Field of the Invention

The present invention relates to a technology for relaying data between a plurality of adapters and a controller.

2. Description of the Related Art

In recent years, improved processing ability of computers has resulted in ever increasing volume of data used by the computers. Technologies related to storage of considerable volume of data are being examined. Specifically, for example, one of the technologies called Redundant Array of Independent Disks (RAID) involves combining a plurality of hard disk drives to realize a speedy, highly reliable, and high capacity disk system.

In a disk system such as RAID, a disk array device, which includes a plurality of disks for storing data, receives commands from a host computer and performs data read and data write operation. In this process, the data that is exchanged between the host computer and the disks is cached in a cache memory of the disk array device. Generally, subsequent processes become speedy when the data is read from the cache memory instead of reading the data from the host computer or the disks.

For example, Japanese Patent No. 2567922 discloses a conventional technology in which a plurality of channels is arranged in between a host computer and a disk array device for efficient transfer of data. A plurality of channel adapters in the disk array device is connected to the host computer. In the conventional technology, a plurality of data transfer routes is formed, which includes the respective channel adapters, between a cache memory of the disk array device and the host computer.

When, for example, a command or user data from a host computer to be written onto a disk in a disk array device is input into a channel adapter, the command or the user data are transferred to a cache memory through a switch, which transforms data transfer routes into one transfer route to relay the command or the user data. The command or the user data are not directly transferred from the switch to the cache memory. In other words, the command or the user data are first transferred from the switch to a cache controller that controls the cache memory. The cache controller processes the command or the user data and then transfers the command or the user data to the cache memory. That is, for example, when the host computer issues a command to read user data, the channel adapter sends a read request to the cache controller through the switch. As a result, a processor, such as a central processing unit (CPU), in the cache controller reads the user data from the cache memory. Subsequently, the cache controller sends the user data to the channel adapter in response to the read request, and the channel adapter sends the user to the host computer.

However, because the cache controller various processes, such as processing of the read request and transferring of data between a disk and the cache memory, sometimes there is a lot of load on the cache controller. If the cache controller is busy, a delay may occur in sending a response to the read request from the cache controller to the channel adapter. If the delay is longer than a predetermined period, it causes a time-out error in the channel adapter, and the channel adapter notifies an error to the host computer.

Figure 10:
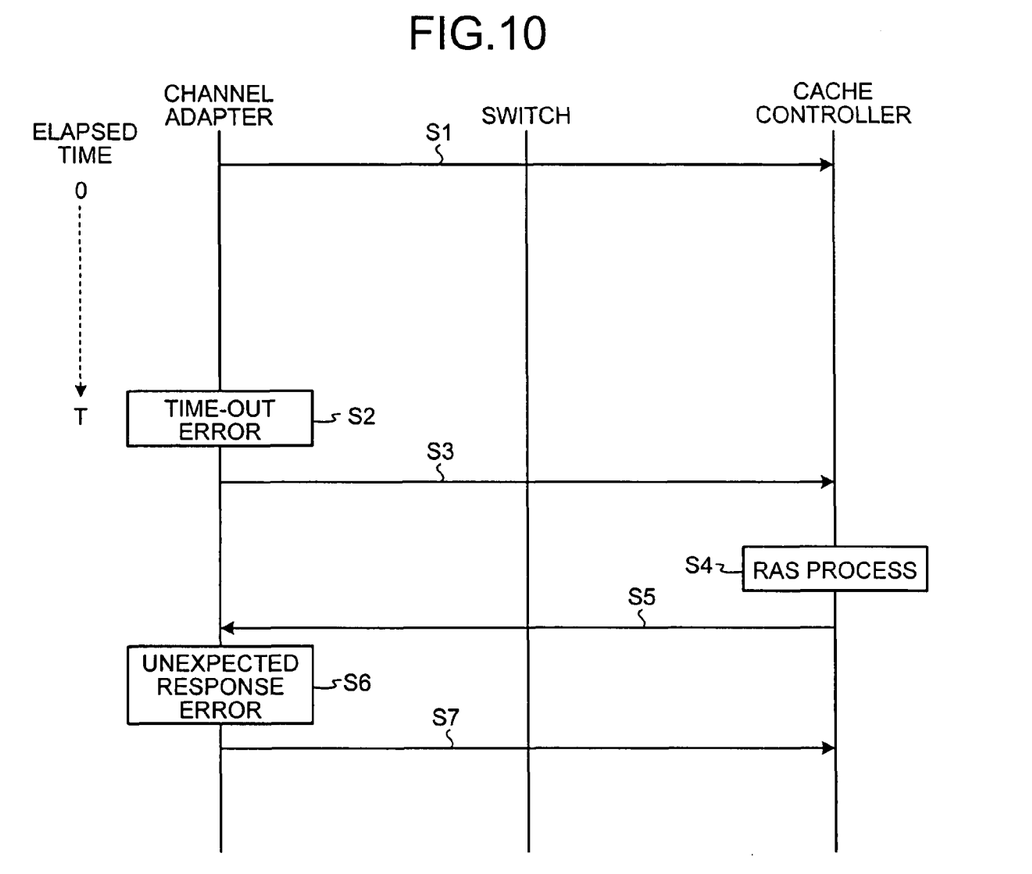
FIG. 10 is a sequence chart for explaining how and why a time-out error occurs.

Specifically, for example, as shown in FIG. 10, a read request is sent from a channel adapter based on a command from a host computer (not shown) to a cache controller via a switch (step S1). If processing load on a CPU in the cache controller is relatively light, user data is read from a cache memory at the earliest and is returned to the channel adapter as a read response. However, if the processing load on the CPU in the cache controller is relatively heavy, longer time is required for reading used data, which results in delay. If a predetermined period of time T elapses from the time point at which the read request was sent, a time-out error occurs in the channel adapter (step S2).

When the time-out error occurs, the channel adapter notifies the host computer and the cache controller regarding the error simultaneously (step S3). The cache controller is notified regarding the error as a hardware interrupt. Subsequently, the processor in the cache controller starts a process of reliability, availability, serviceability (RAS) for recovery, on a priority basis (step S4). This results in increasing the load on the CPU in the cache controller. When the load on the processor increases, a process of data transfer in the cache memory, which is the original function of the cache controller, is stagnated.

After completion of the RAS process, it may happen that the user data is sent from the cache controller to the channel adapter (step S5). Because the channel adapter receives the user data after the occurrence of the time-out error, i.e., when the channel adapter is not expecting any data from the cache controller, it generates an unexpected response error in the channel adapter (step S6).

Even when the unexpected response error occurs, the channel adapter notifies occurrence of the error to the cache controller as a hardware interrupt (step S7). This further increases the load on the CPU in the cache controller and affects the process of data transfer.

SUMMARY OF THE INVENTION

It is an object of the present invention to at least partially solve the problems in the conventional technology.

According to an aspect of the present invention, there is provided a data relay device that relays a read request from a source device to a destination device and relays data corresponding to the read request from the destination device to the source device. The data relay device includes a relay unit that receives a read request from the source device and relays the read request to the destination device; a counting unit that counts elapsed time from a time point at which the relay unit relays the read request to the destination device; a monitoring unit that monitors whether the elapsed time has reached a threshold; and an informing unit that informs the source device that the elapsed time has reached the threshold upon result of monitoring by the monitoring unit indicating that the elapsed time has reached the threshold.

According to another aspect of the present invention, there is provided a storage device that stores, in a storing medium, user data that is read by a host computer. The storage device includes a plurality of channel adapters each of which capable of outputting a read request to read user data from the storing medium based on a command from the host computer; a switch that receives a read request from a first channel adapter from among the channel adapters and relays the read request; and a cache controller that receives the read request from the switch, reads user data corresponding to the read request from the storing medium, and sends the user data to the first channel adapter through the switch. The switch includes a relay unit that receives the read request from the first channel adapter and relays the read request to the cache controller; a counting unit that counts elapsed time from a time point at which the relay unit relays the read request to the cache controller up to a time point at which data is received from the cache controller in response to the read request; a monitoring unit that monitors whether the elapsed time has reached a threshold; and an informing unit that informs the first channel adapter that the elapsed time has reached the threshold upon result of monitoring by the monitoring unit indicating that the elapsed time has reached the threshold.

According to still another aspect of the present invention, there is provided a method of monitoring a delay in a response by a data relay device that relays a read request from a source device to a destination device and relays data corresponding to the read request from the destination device to the source device. The method includes receiving a read request from the source device and relaying the read request to the destination device; counting elapsed time from a time point at which the read request is relayed to the destination device; monitoring whether the elapsed time has reached a threshold; and informing the source device that the elapsed time has reached the threshold when it is determined at the monitoring that the elapsed time has reached the threshold.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
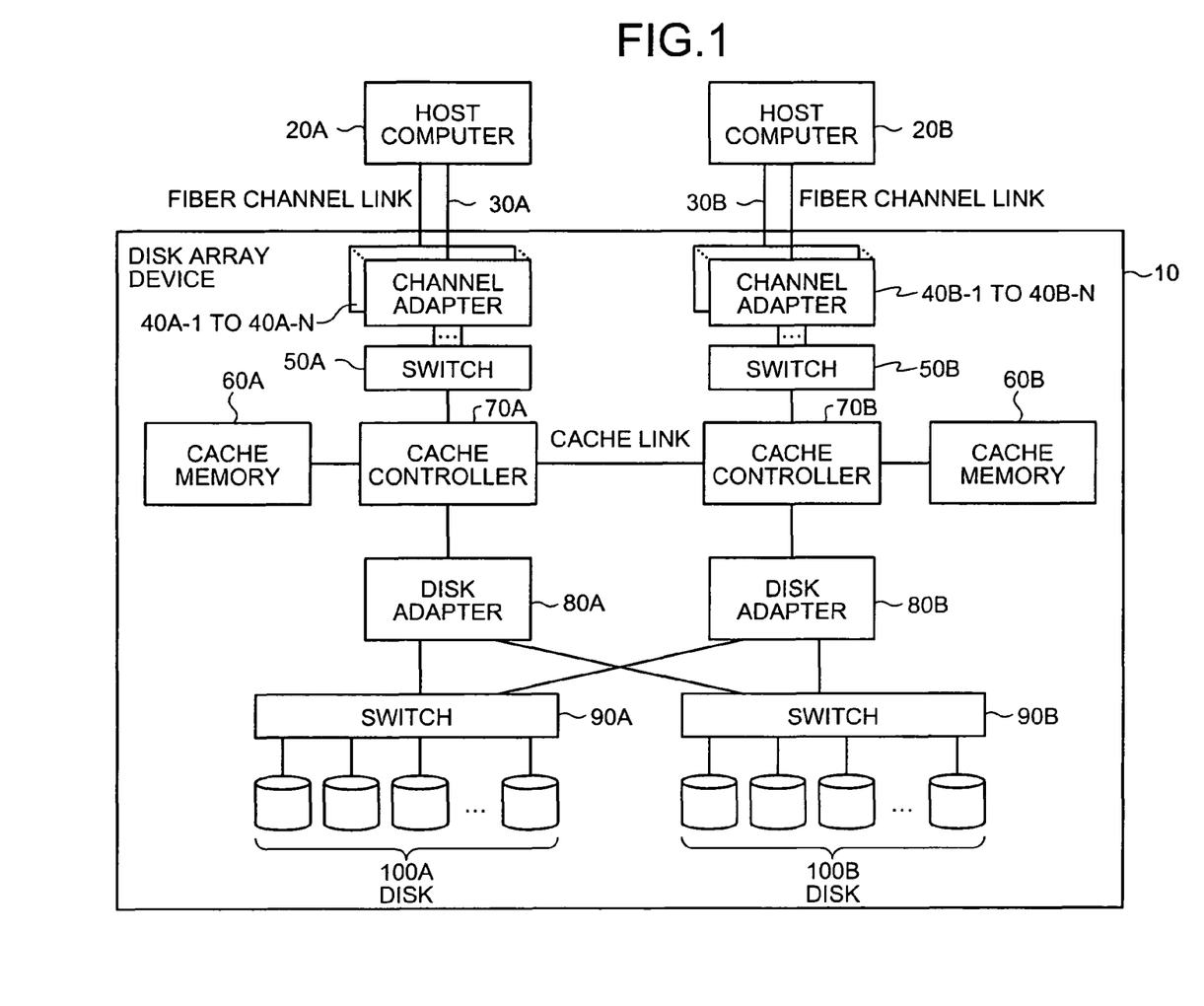
FIG. 1 is a block diagram of a disk array device according to a first embodiment of the present invention.

FIG. 1 is a block diagram of a disk array device 10 according to a first embodiment of the present invention. The disk array device 10 is an example of a computer system that uses direct memory access (DMA), and it is connected to host computers 20A and 20B via fiber channel links 30A and 30B, respectively. The disk array device 10 has a duplex structure to ensure high degree of reliability and each component is in double systems (components in the respective systems are distinguished by reference letters A and B). The components of each system have the same function. Therefore, explanation given below is only about one system, i.e., "A" system.

The disk array device 10 includes a plurality of channel adapters 40A-1 to 40A-N (N is a natural number equal to or larger than 2), a switch 50A, a cache memory 60A, a cache controller 70A, a disk adapter 80A, a switch 90A, and a disk 100A.

The channel adapters 40A-1 to 40A-N are each connected to a host computer 20A, and function as a communication interface to send data to and receive data from the host computer 20A. Each of the channel adapters 40A-1 to 40A-N includes a DMA chip that manages data transfer by DMA. The channel adapters 40A-1 to 40A-N have the same functions. If an error occurs in a channel adapter 40A-M (M is a natural number from 1 to N), the channel adapters 40A-1 to 40A-N are forcibly or voluntarily shut down by the cache controller 70A.

The switch 50A relays a read request or a response to the read request between the channel adapters 40A-1 to 40A-N and a cache memory 60A via the cache controller 70A. In this process, the switch 50A converts read requests received from each of the channel adapters 40A-1 to 40A-N into one output and relays to the cache controller 70A. The switch 50A counts time elapsed from the point time at which the read requests were relayed, and if a read response is not received even after a predetermined period, the switch 50A sends a warning message to a source of the read request to control issuing of read requests.

The cache memory 60A temporarily stores therein data that is to be written from the host computer 20A to a plurality of disks 100A and data that is to be read from the disks 100A by the host computer 20A.

The cache controller 70A manages and controls writing and reading of data to and from the cache memory 60A. When the cache controller 70A, for example, reads user data from the cache memory 60A in response to the read request received from the channel adapter 40A-M through the switch 50A, the cache controller 70A returns the user data to the channel adapter 40A-M as a response to the read request. Furthermore, the cache controller 70A issues a read request for reading state data indicating state of the channel adapters 40A-1 to 40A-N as and when necessary. The cache controller 70A is connected to a cache controller 70B of another system by a cache link, so that user data to be written to cache memories 60A and 60B can be shared.

The disk adapter 80A functions as a communication interface for sending and receiving data to and from the disks 100A. In other words, the disk adapter 80A sends user data read from the cache memory 60A to the disks 100A and receives user data that is to be written in the cache memory 60A from the disks 100A.

The switch 90A is connected to the disks 100A, and switches a connection between each of the disks 100A and the disk adapter 80A. The disks 100A can be hard disk drives, and store therein user data that is to be read and written in the cache memory 60A.

Figure 2:
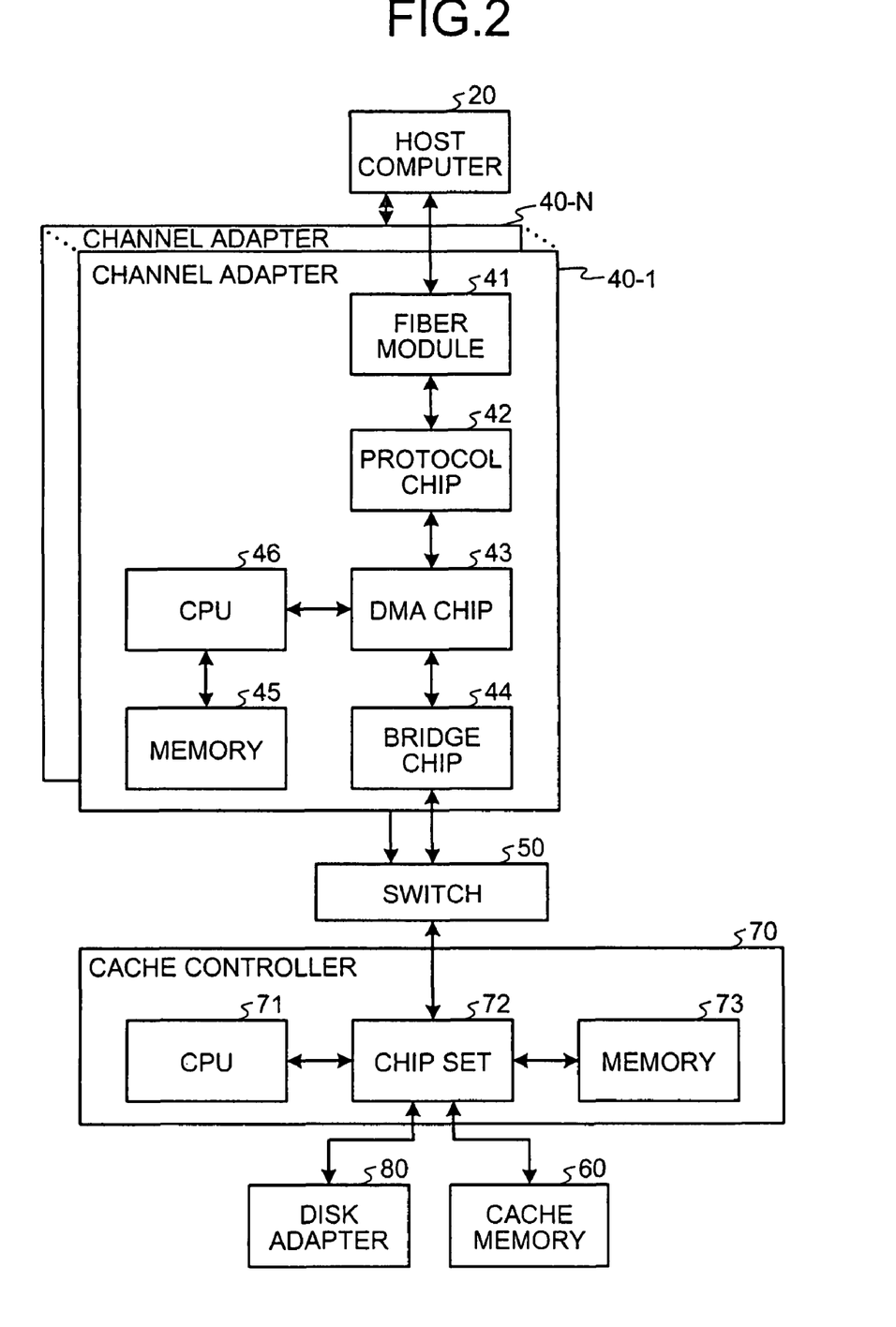
FIG. 2 is a block diagram of a relevant part in the disk array device.

FIG. 2 is a block diagram of a relevant part of the disk array device 10. Reference letters A and B in FIG. 1 are omitted in FIG. 2. In other words, a host computer 20 shown in FIG. 2 can be any of the host computers 20A and 20B. Of the components of the disk array device 10 shown in FIG. 1, FIG. 2 depicts channel adapters 40-1 to 40-N, a switch 50, a cache memory 60, a cache controller 70, and a disk adapter 80. Detailed structure of the channel adapter 40-1 and the cache controller 70 is also shown in FIG. 2.

The channel adapter 40-1 includes an optical module 41, a protocol chip 42, a DMA chip 43, a bridge chip 44, a memory 45, and a CPU 46.

The optical module 41 is connected to the host computer 20. The optical module 41 converts optical signals from the host computer 20 transmitted through optical fibers and the like to electric signals, and electric signals output from the protocol chip 42 to optical signals, and transmits the resultant signals to the host computer 20.

The protocol chip 42 is large scale integration (LSI) for controlling a protocol of a fiber channel link (the fiber channel links 30A and 30B in FIG. 1) used for connecting the host computer 20 to the channel adapter 40-1. The protocol chip 42 outputs commands and user data exchanged between the channel adapter 40-1 and the host computer 20 as electric signals to the optical module 41 or the DMA chip 43.

The DMA chip 43 functions as an interface for communicating with the cache memory 60 that is connected to the cache controller 70. The DMA chip 43 communicates with the cache memory 60, and transfers data in response to instructions from the CPU 46. Specifically, for example, when a command to read user data is received from the host computer 20, the DMA chip 43 sends a read request requesting transfer of the user data to the cache controller 70 through the bridge chip 44. When the DMA chip 43 receives a warning message from the switch 50 that the read response is delayed, the DMA chip 43, for example, terminates reception of commands from the host computer 20 and restrains from issuing of read requests.

The bridge chip 44 is connected to the switch 50. The bridge chip 44 sends read requests issued by the DMA chip 43 to the switch 50 and receives read responses in response to the read requests from the switch 50.

The memory 45 can be a dynamic random access memory (DRAM), and stores therein a descriptor (instructions from the CPU 46 to the DMA chip 43) generated by the CPU 46.

The CPU 46 controls the overall operations of the channel adapter 40-1. The CPU 46 interprets a command from the host computer 20 and issues an instruction of data transfer to the DMA chip 43. Specifically, for example, when a command to read user data is received from the host computer 20, the CPU 46 causes the DMA chip 43 to issue a read request to the cache controller 70. When the CPU 46 receives from the switch 50 an error message that a response to the read request is delayed, the CPU 46 voluntarily shuts down the channel adapter 40-1 and separates the channel adapter 40-1 from the system.

The protocol chip 42, the DMA chip 43, and the CPU 46 are connected to each other by a peripheral component interconnect (PCI) bus (not shown), and data transfer and issuing of data transfer instructions are executed via the PCI bus.

The cache controller 70 includes a CPU 71, a chip set 72, and a memory 73.

The CPU 71 controls the overall operations of the cache controller 70. The CPU 71 instructs the chip set 72 to read and write user data to the cache memory 60 and to transfer data to the disk adapter 80. Specifically, when the CPU 71, for example, receives a read request from the channel adapter 40-1, the CPU 71 instructs the chip set 72 to read user data from the cache memory 60 and to return the user data in response to the read request to the channel adapter 40-1. When an error occurs, the CPU 71, for example, performs RAS process to recover from the error. Thereafter, the CPU 71 causes the chip set 72 to send a read request to read the state data that indicates the state of the channel adapters 40-1 to 40-N to the switch 50.

In response to an instruction from the CPU 71, the chip set 72 reads the user data from the cache memory 60. The chip set 72 sends the user data to the switch 50 as the read response, and transfers it to the disk adapter 80. Furthermore, when the CPU 71 performs the RAS process, the chip set 72 sends a read request to read the state data to the switch 50.

The memory 73 can be a DRAM, and stores therein instructions generated by the CPU 71 for the chip set 72.

Figure 3:
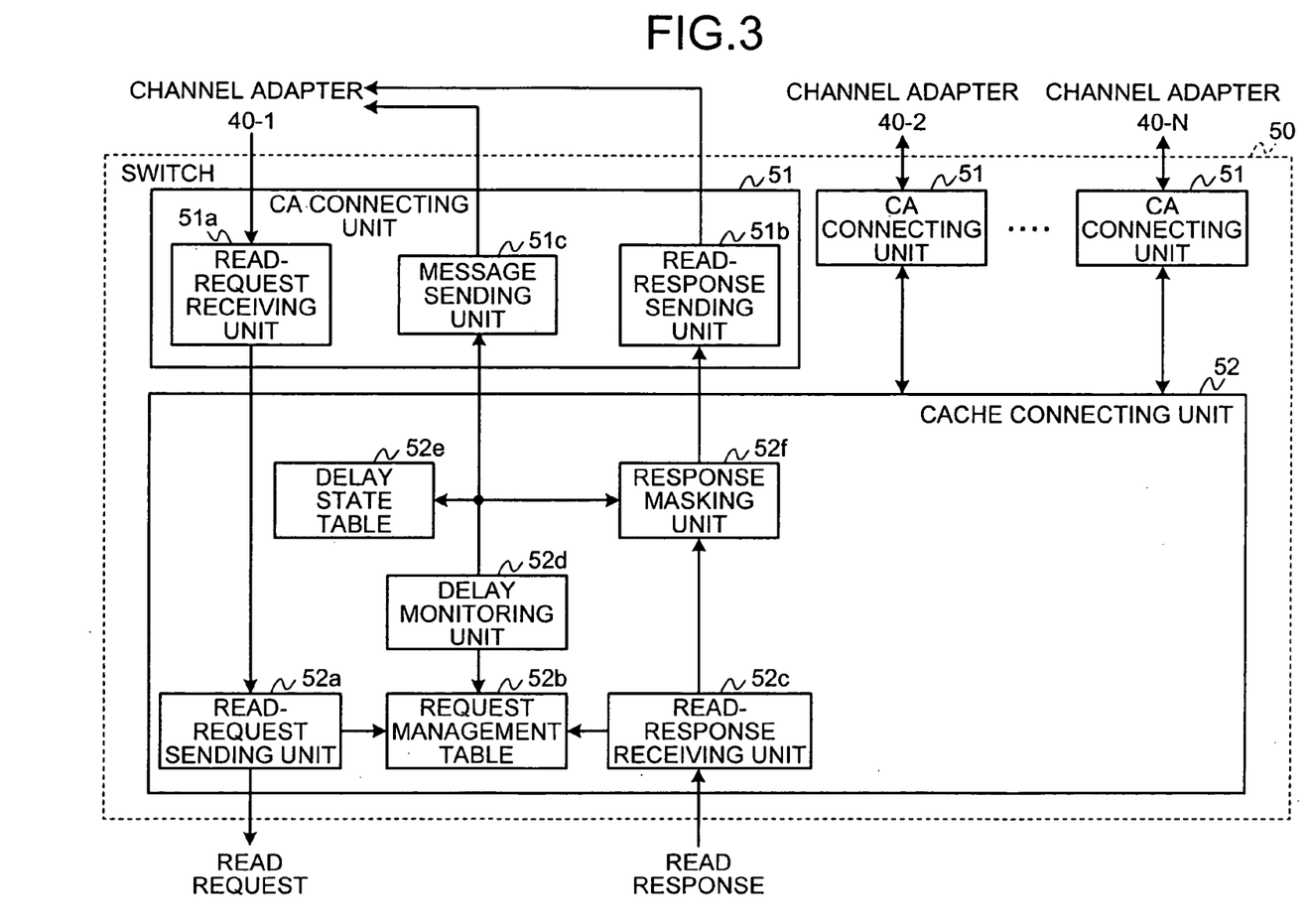
FIG. 3 is a block diagram of a switch shown in FIG. 1.

FIG. 3 is a block diagram of the switch 50. The switch 50 includes a channel adapter (CA) connecting unit 51 corresponding to each of the channel adapters 40-1 to 40-N, and a cache connecting unit 52, which is connected to the cache controller 70. Each of the CA connecting unit 51 includes a read-request receiving unit 51a, a read-response sending unit 51b, and a message sending unit 51c. The structure of the CA connecting unit 51 that is connected to the channel adapter 40-1 is only shown in detail in FIG. 3. The CA connecting units 51 other than the CA connecting unit 51 have the same or similar structure as that of the CA connecting unit 51.

The channel adapter 40-1 receives a command to read the user data from the host computer 20 and sends a read request to the read-request receiving unit 51a. The read request is then sent to the cache connecting unit 52.

The read-response sending unit 51b sends a read response received from the cache connecting unit 52 to the channel adapter 40-1 that in turn returns the read response to the host computer 20. That is, the read-response sending unit 51b sends the user data requested by the host computer 20 to the channel adapter 40-1.

The message sending unit 51c sends a warning message to the channel adapter 40-1 when a warning time period has elapsed after sending a read request to the cache controller 70 following an instruction from the cache connecting unit 52. When an error time period has elapsed after sending a read request, the message sending unit 51c sends an error message to the channel adapter 40-1.

On the other hand, the cache connecting unit 52 includes a read-request sending unit 52a, a request management table 52b, a read-response receiving unit 52c, a delay monitoring unit 52d, a delay state table 52e, and a response masking unit 52f.

The read-request sending unit 52a sends a read request received from the read-request receiving unit 51a to the cache controller 70. The read-request sending unit 52a notifies the request management table 52b of a tag that identifies the read request.

Figure 4:
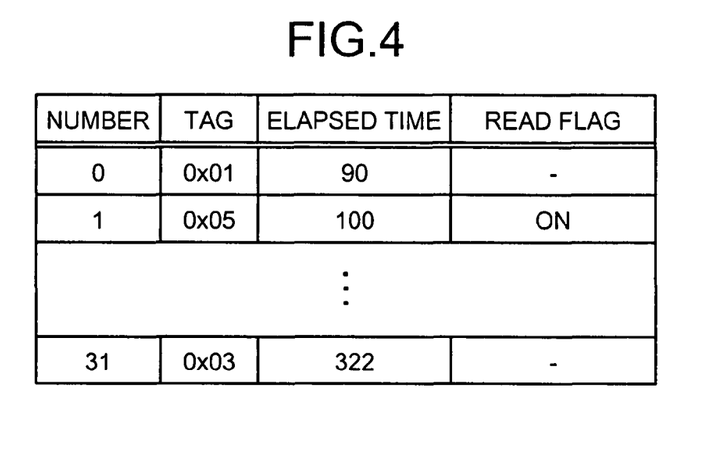
FIG. 4 is an example of contents of a request management table shown in FIG. 3.

The request management table 52b manages time of each of the tags that elapsed after the read request is sent to the cache controller 70. Specifically, the request management table 52b, for example, is a table as shown in FIG. 4. That is, the request management table 52b stores therein a tag for each of the read requests sent by the read-request sending unit 52a, elapsed time, read flag indicating whether the user data is being read. When notified of a tag for a read request sent afresh from the read-request sending unit 52a, the cache connecting unit 52 records this tag on the request management table 52b, starts count of the elapsed time, and sets the read flag to ON. Furthermore, upon receiving a read response from the read-response receiving unit 52c through the request management table 52b, the cache connecting unit 52 terminates count of elapsed time corresponding to the read request and clears the read flag from the request management table 52b.

When the request management table 52b receives the tag for the read request from the read-request sending unit 52a, it records the read request at a stage where the read flag is cleared. The number of rows in the request management table 52b is more than the number of read requests that are to be processed at the same time. That is, for example, in the peripheral component interconnect extended (PCI-X) standard, the number of rows is more than 32.

The read-response receiving unit 52c receives user data read by the cache controller 70 as a read response from the cache controller 70 and outputs it to the response masking unit 52f. The read-response receiving unit 52c notifies the tag of the read request corresponding to the read response to the request management table 52b.

The delay monitoring unit 52d monitors elapsed time of each of the read request, counted by the request management table 52b. Specifically, the delay monitoring unit 52d judges whether the elapsed time corresponding to each of the read request has reached a warning time period. If the elapsed time has reached the warning time period, the delay monitoring unit 52d judges whether elapsed time corresponding to the read request has reached an error time period. The warning time period is the time shorter than the time from when a channel adapter 40-M from among the channel adapters 40-1 to 40-N receive a command from the host computer 20 to when it is judged that a time-out error has occurred. The error time period is of substantially equivalent duration between a point of time when the channel adapter 40-M receive a command from the host computer 20 and when it is judged that a time-out error has occurred.

If the elapsed time for a read request has reached the warning time period, the delay monitoring unit 52d records that read request into the delay state table 52e. If the elapsed time for a read request has reached the error time period, the delay monitoring unit 52d instructs the response masking unit 52f to discard a read response corresponding to the read request, and updates a type of delay of the read request recorded in the delay state table 52e from warning state to error state. Furthermore, the delay monitoring unit 52d instructs the message sending unit 51c in the CA connecting unit 51, which has sent a read request for which the elapsed time has reached the warning time period or the error time period, to send a warning message or an error message to the channel adapter 40-M.

The delay state table 52e manages delay state of the read request whose elapsed time after sending the read request to the cache controller 70 has exceeded the warning time period. Specifically, the delay state table 52e is, for example, something like that shown in FIG. 5. That is, the delay state table 52e stores therein information such as results of elapsed time monitoring done by the delay monitoring unit 52d, tags of each of the read requests whose elapsed time after sending the read request to the cache controller 70 has exceeded the warning time period, addresses, response time, response flags, and type of delay.

Figure 5:
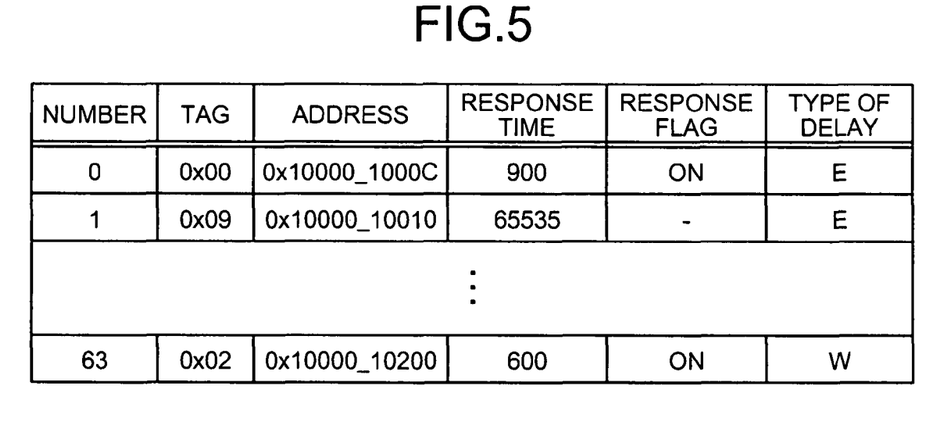
FIG. 5 is an example of contents of a delay state table shown in FIG. 3.

In FIG. 5, for example, a read request with number "0" has response time "900", and the response flag is set to "ON", whereby it is understood that the response is issued when elapsed time is 900, which has already exceeded the error time period. Therefore, the type of delay is error state, indicated by "E". Similarly, a read request with number "1" whose response flag is not yet set indicates that there is no response yet to the read request. Furthermore, a read request with number "63" has response time "600", and the response flag is set to "ON", whereby it is understood that the response is issued when elapsed time is 600, and the elapsed time has exceeded the warning time period. Therefore, the type of delay is warning state, indicated by "W".

The delay state table 52e records afresh a read request whose elapsed time is at warning time period under the type of delay "W". If the elapsed time of the read request reaches the error time period, the type of delay is updated to "E". When a read response is issued, response time for each of the read requests is recorded, and the response flag is set to "ON". According to an instruction from the delay monitoring unit 52d the response masking unit 52f discards a part of read response output from the read-response receiving unit 52c and masks them. That is, the response masking unit 52f discards a read response to a read request whose elapsed time has reached the error time period. The response masking unit 52f sends read responses that are not the target of discarding to the read-response sending unit 51b.

Figure 6:
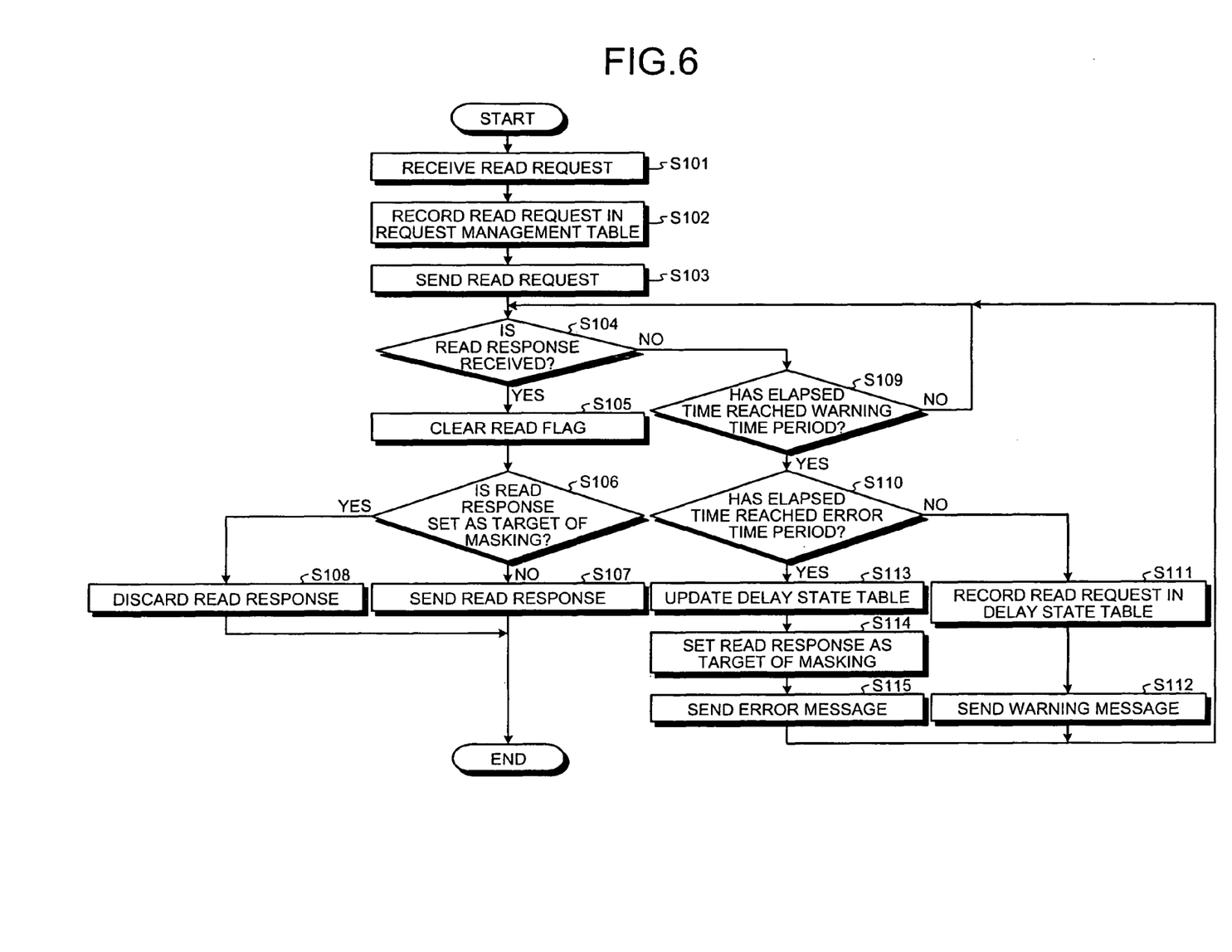
FIG. 6 is a flowchart of operations performed by the switch.

FIG. 6 is a flowchart of operations performed by the switch 50. Explained below is an operation where the channel adapter 40-1, which has received a command from the host computer 20, sends a read request to the switch 50.

The read-request receiving unit 51a receives a read request from the channel adapter 40-1 (step S101). The read-request receiving unit 51a sends the read request to the read-request sending unit 52a, the read-request sending unit 52a records the read request in the request management table 52b as a new read request (step S102), and sends the read request to the cache controller 70 (step S103). The read-response receiving unit 52c waits for a read response from the cache controller 70 (step S104).

If the processing load on the CPU 71 in the cache controller 70 is relatively light, the CPU 71 reads the user data from a cache memory at the earliest and sends the read user data to the read-response receiving unit 52c as a read response (Yes at step S104). When the read-response receiving unit 52c receives the read response, it clears the read flag of the read request corresponding to the read response in the request management table 52b (step S105). In the request management table 52b shown in FIG. 4, a read flag that has been cleared is shown with a dash ("-").

The read response received by the read-response receiving unit 52c is output to the response masking unit 52f, and it is judged whether the read response is set as a target of masking (step S106). In other words, a read response received after the elapsed time has reached the error time period is judged to be the read response that is the target of masking. The delay monitoring unit 52d sets a read response as a masking target when elapsed time for the read response reaches the error time period.

On the other hand, if the read response has not been set as a target of masking (No at step S106), the read response is sent to the channel adapter 40-1 via the read-response sending unit 51b (step S107). The read response is then sent from the channel adapter 40-1 to the host computer 20. Thus, the host computer 20 receives the requested user data. If the read response has been set as a target of masking (Yes at step S106), the read response is discarded and not sent to the channel adapter 40-1 (step S108). Thus, read responses corresponding to the read requests, in which a time-out error has occurred, are not sent to the channel adapter 40-1, i.e., the channel adapter 40-1 does not receive any unexpected read response.

When the read-response receiving unit 52c is waiting to receive a read response, and at such a time if the processing load on the CPU 71 is relatively heavy, reading of the user data from the cache memory 60 is disadvantageously delayed. Accordingly, the read response is not received by the read-response receiving unit 52c (No at step S104). In the meanwhile, the delay monitoring unit 52d constantly monitors the elapsed time of the read request whose read flag is set in the request management table 52b. The elapsed time is monitored to see whether the elapsed time has reached the warning time period (step S109). In the case of a read request whose elapsed time has not reached the warning time period (No at step S109), the read-response receiving unit 52c continues to wait for a read response.

In the case of a read request whose elapsed time has reached the warning time period (Yes at step S109), it is judged whether the elapsed time has reached the error time period (step S110). If the elapsed time is longer than the warning time period and not yet reached the error time period (No at step S110) the delay monitoring unit 52d records the read request in the delay state table 52e (step S111). As shown in FIG. 5 a tag and an address of the read request is recorded in the delay state table 52e, a response flag is set to OFF ("-"), and a type of delay is indicated by "W". An instruction is sent by the delay monitoring unit 52d to the message sending unit 51c to send a warning message. The message sending unit 51c is the one that has received the read request, whose elapsed time has reached the warning time period, from the channel adapter 40-1. Upon receiving the instruction, the message sending unit 51c sends a warning message to the channel adapter 40-1 that the read response is delayed (step S112), and the read-response receiving unit 52c enters into a standby state to receive subsequent read response.

Upon receiving the warning message from the switch 50, the channel adapter 40-1 understands that the process corresponding to the read request is delayed. Accordingly, the channel adapter 40-1 restrains from sending read requests and terminate reception of commands from the host computer 20. Thus, the number of read requests sent from the channel adapters 40-1 decreases, consequently, load on the CPU 71 also decreases. As a result, the delay can be relaxed.

If the elapsed time has reached the error time period (Yes at step S110), because the read request is already recorded in the delay state table 52e by the delay monitoring unit 52d at the point of time when the elapsed time has reached the warning time period, the delay monitoring unit 52d updates delay type of the read request in the delay state table 52e (step S113). As shown in the delay state table 52e in FIG. 5, the delay type is updated to error state indicated by "E". The delay monitoring unit 52d sets the read response corresponding to the read request to the response masking unit 52f as a target of masking (step S114). Even if the read response corresponding to the read request, whose elapsed time has reached error time period, is returned by the cache controller 70, the read response is discarded and not sent to the channel adapter 40-1.

Along with the update of the delay state table 52e and setting of the masking targets, the delay monitoring unit 52d outputs an instruction to send an error message to the message sending unit 51c. The message sending unit 51c is the one that has received from the channel adapter 40-1 the read request whose elapsed time has reached the error time period. Upon receiving the instruction, the message sending unit 51c sends the error message to the channel adapter 40-1 (step S115).

Because a time-out error occurs in the channel adapter 40-1 simultaneously with the reception of the error message from the switch 50, the channel adapter 40-1 notify the host computer 20 and the cache controller 70 regarding occurrence of the time-out error and voluntarily performs the process of shut down of and separation from the system. Because the channel adapter 40-1 is shut down, the number of the read requests sent from the channel adapter 40-1 to the cache controller 70 decreases, which decreases processing load on the CPU 71.

The CPU 71, which has been notified about the occurrence of the error from the channel adapter 40-1, starts RAS process for recovery from error. The CPU 71 refers to the delay state table 52e to identify the channel adapter 40-1 in which the error has occurred instead of reading state data of all the channel adapters 40-1 to 40-N to identify the channel adapter 40-1 in which the error has occurred. Thus, as compared to the situation where the state data of all of the channel adapters 40-1 to 40-N is read, the processing load on the CPU 71 is further reduced.

Figure 7:
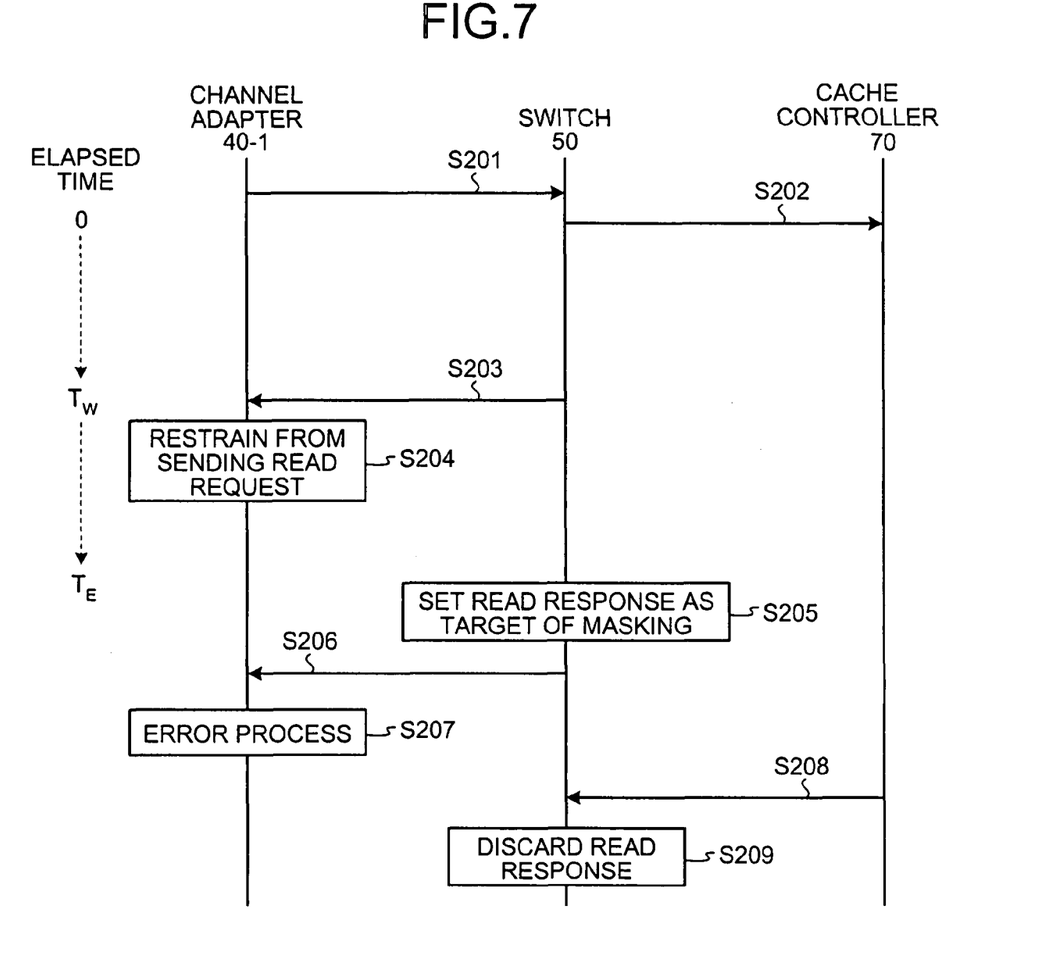
FIG. 7 is a sequence chart of operations performed by a channel adapter, the switch, and a cache controller shown in FIG. 1 when reading user data.

FIG. 7 is a sequence chart of operations performed by the channel adapter 40-1, the switch 50, and the cache controller 70 when the user data stored in the cache memory 60 is read in response to a command from the host computer 20.

The channel adapter 40-1, which receives a command to read the user data from the host computer 20, sends a read request to the switch 50 (step S201). The read request is received by the read-request receiving unit 51a, and is sent to the cache controller 70 via the read-request sending unit 52a (step S202). Moreover, the read request is recorded in the request management table 52b, and counting of elapsed time is started in the delay monitoring unit 52d. A process of reading the user data from the cache memory 60 is performed as a read response to the read request in the cache controller 70. However, if processing load on the CPU 71 is heavy because the CPU 71 is performing other processes, the process of reading is not performed immediately, and delay occurs.

When the elapsed time reaches warning time period $T_W$, the delay monitoring unit 52d records the read request in the delay state table 52e, and a warning message is sent to the channel adapter 40-1 from the message sending unit 51c (step S203). The channel adapter 40-1 that receives the warning message restrains from sending a read request to the cache controller 70 (step S204). However, at this point of time, a time-out error has not occurred so that the channel adapter 40-1 is waiting to receive a read response from the cache controller 70 through the switch 50.

Despite the channel adapter 40-1 restraining from sending read requests, and without any read response from the cache controller 70, when the elapsed time reaches an error time period $T_E$, the type of delay of the read request in the delay state table 52e is updated to the error state by the delay monitoring unit 52d. Simultaneously, a read response to the read request is made a target of masking by the delay monitoring unit 52d and is set as the target of masking in the response masking unit 52f (step S205). An error message is sent from the message sending unit 51c to the channel adapter 40-1 (step S206). Simultaneously, because a time-out error occurs in the channel adapter 40-1 with respect to the process between the channel adapter 40-1 and the host computer 20, the channel adapter 40-1 executes an error process by notifying error to the host computer 20, and voluntarily shutting down the system (step S207).

Thereafter, assume that the processing load on the CPU 71 in the cache controller 70 is reduced, and the read response corresponding to the read request which is at the error time period is sent from the cache controller 70 to the switch 50 (step S208). The read response is received by the read-response receiving unit 52c and is output to the response masking unit 52f. Because the read response is set in the response masking unit 52f as a target of masking, the read response is not sent from the read-response sending unit 51b to the channel adapter 40-1, and is discarded (step S209). Thus, the channel adapter 40-1 does not receive the read response corresponding to the read request that is already processed, and occurrence of error of receiving unexpected read response by the channel adapter 40-1 can be prevented. Because the CPU 71 does not need to perform the RAS process related to the unexpected read response the processing load on the CPU 71 can be reduced.

Because the processing load on the CPU 71 is reduced, the original function of data transfer of the cache controller 70 is not stagnated, and data transfer between the host computer 20 and the disk array device 10 is executed speedily.

According to the first embodiment, when a channel adapter reads user data in the cache memory, a switch, which relays user data in the form of a read request and a read response, counts time that elapsed after the read request is issued. When the elapsed time reaches a predetermined warning time period, the switch sends a warning message to the channel adapter and restrains the channel adapter from issuing subsequent read requests. Thus, processing load on a CPU connected to the cache memory can be reduced, and delay in response can be curtailed. When the elapsed time reaches a predetermined error time period, the switch discards a read response corresponding to the read request and does not return the read response to the channel adapter. Thus, the channel adapter is prevented from receiving an unexpected read response. This results in reducing processing load on the CPU because the CPU does not need to perform RAS process with respect to an unexpected read response and processing load on a CPU connected to the cache memory can be reduced.

According to a second embodiment of the present invention, when a CPU of the cache controller is performing the RAS process, the CPU reads state data that indicates state of the channel adapter, and a switch monitors delay occurring in responding to the read request.

A skeletal framework of the disk array device 10 and internal structure of a channel adapter 40-1 according to the second embodiment is the same as those in the first embodiment (FIGS. 1 and 2). Therefore, explanation regarding the disk array device 10 and the channel adapter 40-1 is omitted. The structure of a switch according to the second embodiment is different from that in the first embodiment.

Figure 8:
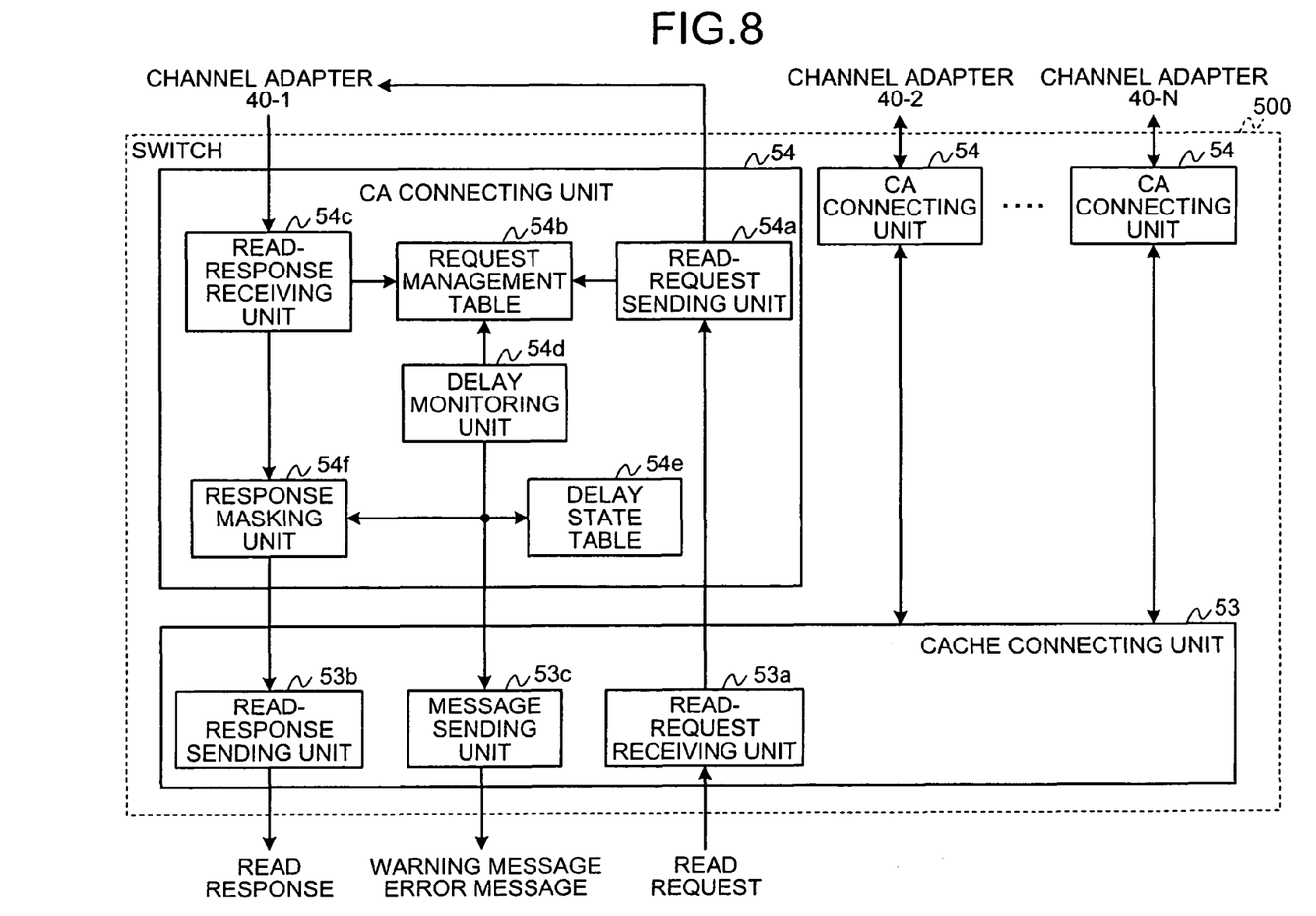
FIG. 8 is a block diagram of a switch according to a second embodiment of the present invention.

FIG. 8 is a block diagram of a switch 500 according to the second embodiment. As shown in FIG. 8, the switch 500 includes a cache connecting unit 53 connected to the cache controller 70 and a CA connecting unit 54 connected to each of the channel adapters 40-1 to 40-N. The cache connecting unit 53 includes a read-request receiving unit 53a, a read-response sending unit 53b, and a message sending unit 53c.

The read-request receiving unit 53a receives a read request for reading the state data of the channel adapter 40-1, while the CPU 71 is performing the RAS process, and sends the state data to the CA connecting unit 54 connected to the channel adapter 40-1.

The read-response sending unit 53b sends a read response, which is received from the CA connecting unit 54, to the cache controller 70. That is, the read-response sending unit 53b sends the state data of the channel adapter 40-1 to the cache controller 70.

In response to an instruction from the CA connecting unit 54, the message sending unit 53c sends to the cache controller 70 a warning message when a period of time of warning time period elapses after the read request is sent to the channel adapter 40-1. The message sending unit 53c sends an error message to the cache controller 70 when an error time period elapses. At such time, the message sending unit 53c specifies the channel adapter 40-1 to which a response is delayed and sends the warning message and the error message to the cache controller 70. That is, the message sending unit 53c includes information related to the channel adapter 40-1 connected to the CA connecting unit 54 in the warning message and the error message.

The CA connecting unit 54 includes a read-request sending unit 54a, a request management table 54b, a read-response receiving unit 54c, a delay monitoring unit 54d, a delay state table 54e, and a response masking unit 54f. The CA connecting unit 54 connected to the channel adapter 40-1 alone is shown in detail in FIG. 8. However, other CA connecting units 54 have the same or similar configuration as that of the CA connecting unit 54.

The read-request sending unit 54a sends a read request sent by the read-request receiving unit 53a to the channel adapter 40-1. The read-request sending unit 54a notifies the request management table 54b regarding a tag of the read request.

The request management table 54b manages time elapsed after being notified regarding each of the tags. The request management table 54b has the same or similar configuration as that of the request management table 52b. When the request management table 54b receives a read response from the read-response receiving unit 54c corresponding to the read request, the request management table 54b terminates counting of the elapsed time corresponding to the read request, and clears a read flag.

The read-response receiving unit 54c receives state data stored in the memory 45 of the channel adapter 40-1 as the read response from the channel adapter 40-1 and outputs to the response masking unit 54f. The read-response receiving unit 54c notifies the request management table 54b regarding a tag of the read request corresponding to the read response.

The delay monitoring unit 54d monitors elapsed time of each of the read request, counted by the request management table 54b. Specifically, the delay monitoring unit 54d judges whether the elapsed time corresponding to each of the read request has reached a warning time period. If the elapsed time has reached the warning time period, the delay monitoring unit 54d judges whether elapsed time corresponding to the read request has reached the error time period. If the elapsed time of a read request has reached a warning time period, the delay monitoring unit 54d records the read request to the delay state table 54e. If the elapsed time of a read request has reached an error time period, the delay monitoring unit 54d instructs the response masking unit 54f to discard a read response corresponding to the read request, and updates the delay type of the read request recorded in the delay state table 54e from warning state to error state. Furthermore, the delay monitoring unit 54d instructs the message sending unit 53c in the cache connecting unit 53 to send a warning message or an error message to the cache controller 70.

The delay state table 54e manages delay state of the read request whose elapsed time after sending the read request to the channel adapter 40-1 has exceeded the warning time period. The delay state table 54e has the same or similar configuration as that of the delay state table 52e. That is, the delay state table 54e stores therein information such as results of elapsed time monitoring done by the delay monitoring unit 54d, tags of each of the read requests whose elapsed time has exceeded the warning time period, addresses, response time, response flags and type of delay.

In response to an instruction from the delay monitoring unit 54d, the response masking unit 54f discards a part of read response output from the read-response receiving unit 54c and masks them. That is, the response masking unit 54f discards a read response to a read request whose elapsed time has reached the error time period. The response masking unit 54f sends read responses that are not the target of discarding to the read-response sending unit 53b in the cache connecting unit 53.

According to the second embodiment, the CPU 71 reads state data of the channel adapters 40-1 to 40-N. A read request is sent from the cache controller 70 to the channel adapters 40-1 to 40-N, and a read response is sent from the channel adapters 40-1 to 40-N to the cache controller 70. The switch 500 relays the read request and the read response. Thus, in contrast to the first embodiment, delay in response from the channel adapters 40-1 to 40-N is monitored.

The causes of delay in response from the channel adapters 40-1 to 40-N are, for example, fault in a bus in the channel adapters 40-1 to 40-N, disappearance of a read request in the channel adapters 40-1 to 40-N. According to the second embodiment, when the cache controller 70 receives a warning message from the switch 500, the cache controller 70 understands that there has been a delay in processing of a read request, and from that point onwards restrains sending of read requests to the channel adapters 40-1 to 40-N. Thus, read requests corresponding to the channel adapters 40-1 to 40-N, in which a fault or an error possibly have occurred, are restrained, and unnecessary read requests from the CPU 71 are reduced, which in effect reduces the load on the CPU 71.

Because delay state of read requests corresponding to each of the channel adapters 40-1 to 40-N is stored in the delay state table 54e, when a time out error occurs in the cache controller 70, the CPU 71 refers to the delay state stored in the switch 500, and is able to understand in which channel adapter has the error occurred. Thus, processing load on the CPU 71 is reduced.

Figure 9:
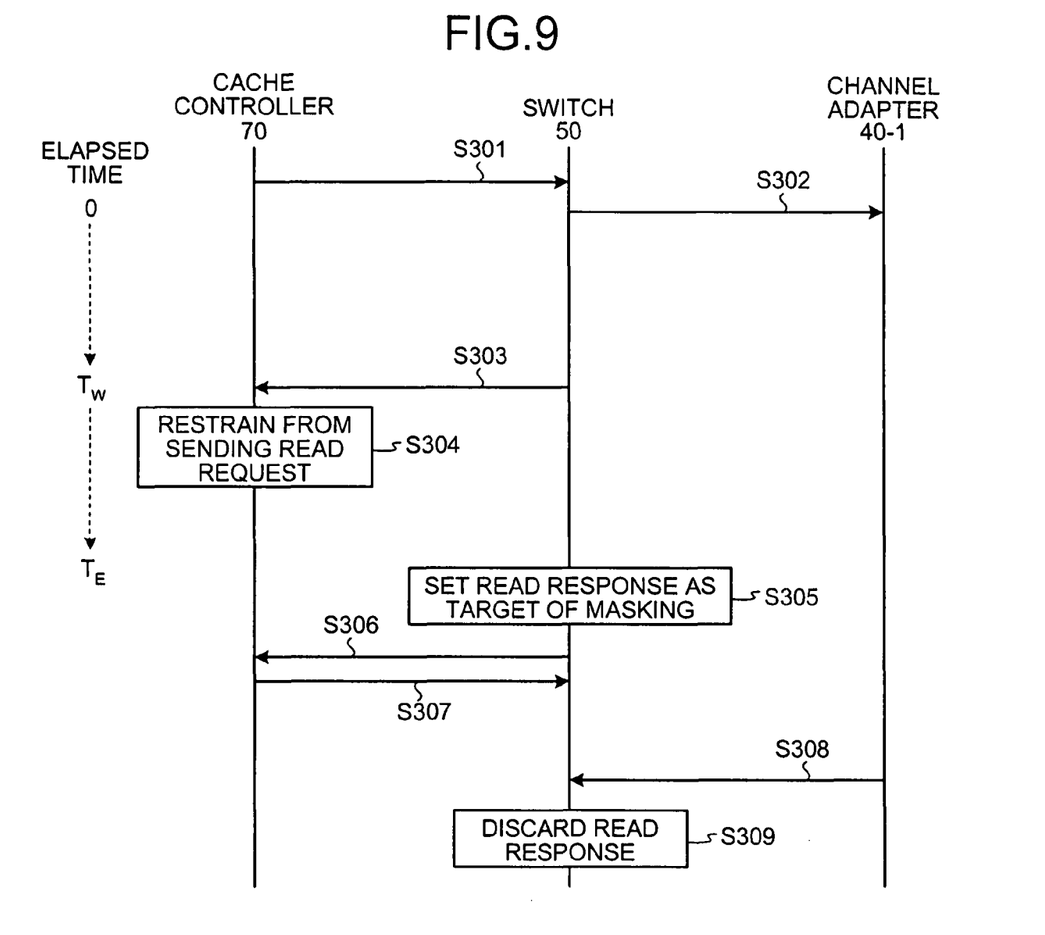
FIG. 9 is a sequence chart of operations performed by a channel adapter, a switch, and a cache controller shown in FIG. 8 when reading user data.

FIG. 9 is a sequence chart of operations performed by the cache controller 70, the switch 500, and the channel adapter 40-1 when the cache controller 70 reads state data of the channel adapter 40-1. It is assumed that an error has occurred in the channel adapter 40-1 whereby a read response is delayed.

When the cache controller 70 starts the RAS process, the cache controller 70 sends a read request for the state data of the channel adapter 40-1 to the switch 500 (step S301). The read request is received by the read-request receiving unit 53a and is sent to the channel adapter 40-1 via the read-request sending unit 54a (step S302). The read request is recorded in the request management table 54b, and count of elapsed time is started in the delay monitoring unit 54d. A process of returning the state data as a read response to the read request is performed in the channel adapter 40-1. However, because an error has occurred in the channel adapter 40-1, the process of return can not be performed immediately, and delay occurs.

When the elapsed time reaches warning time period $T_w$ the delay monitoring unit 54d records the read request in the delay state table 54e, and a warning message is sent to the cache controller 70 from the message sending unit 53c (step S303). The cache controller 70 that receives the warning message restrains from sending a read request to the channel adapter 40-1 (step S304). However, at this point of time, a time-out error has not occurred, and the cache controller 70 is in continuous stand-by position waiting for return of the read response from the channel adapter 40-1 through the switch 500.

When the elapsed time reaches the error time period $T_E$ without any read response from the channel adapter 40-1, and in spite of the cache controller 70 restraining from sending the read request, the type of delay of the read request in the delay state table 54e is updated to the error state by the delay monitoring unit 54d. Simultaneously, the delay monitoring unit 54d makes a read response to the read request a target of masking and sets the read response in the response masking unit 54f (step S305). An error message is sent from the message sending unit 53c to the channel adapter 40-1 (step S306). Because a time-out error occurs in the cache controller 70 simultaneously, the RAS process is started for specifying a cause of the error. However, the delay state table 54e alone is referred instead of reviewing state of all the channel adapters 40-1 to 40-N (step S307). Thus, processing load on the CPU 71 is reduced considerably.

Afterwards, the channel adapter 40-1 recovers from the error and sends a read response, corresponding to the read request which had been in the state of error, to the switch 500 (step S308). The read response is received by the read-response receiving unit 54c, and is output to the response masking unit 54f. The read response is set as a target of masking in the response masking unit 54f. Therefore, the read response is not sent from the read-response sending unit 53b, and is discarded instead (step S309). Thus, the cache controller 70 does not receive the read response corresponding to the read request in which a time-out error has already occurred, and occurrence of error of receiving unexpected read response by the cache controller 70 can be prevented.

According to the second embodiment, when a CPU in a cache controller reads state data of a channel adapter, a switch that relays state of a read request and a read response counts time that elapsed after issuing of the read request. When the elapsed time reaches a predetermined warning time period, the switch sends a warning message to the cache controller and restrains from issuing read requests. Thus, the CPU of the cache controller is not required to perform unnecessary process of sending a read request to the channel adapters in which a fault or an error possibly have occurred, and in effect lightens the load on the CPU. When the elapsed time reaches a predetermined error time period, the switch discards a read response corresponding to the read request and does not return the read response to the cache controller. Simultaneously, the CPU of the cache controller stores therein delay state of each of the channel adapters, so that the delay state can be readily referred to. Thus, the cache controller is not required to receive unexpected read response, and the CPU of the cache controller can identify a channel adapter in which an error has occurred by referring to the delay state stored in the switch.

In each of the above mentioned embodiments, relay of data by the switch 500 of any one of the read requests from respective channel adapters 40-1 to 40-N to the cache controller 70 and from the cache controller 70 to the channel adapters 40-1 to 40-N in any one direction is explained. However, the switch can be configured to relay read requests in both directions as well. When such a configuration is adapted, the switch includes a CA connecting unit that has combined functions of the CA connecting unit 51 and the CA connecting unit 54, and a cache connecting unit that has combined functions of the cache connecting unit 52 and the cache connecting unit 53.

Incidentally, the switch 50 or 500 is provided separately from the cache controller 70. However, the switch 50 or 500 can be provided integrally with the cache controller 70, so that the cache controller 70 also functions as the switch 50 or 500. The CPUs inside the channel adapters 40-1 to 40-N and the cache controller 70 can be replaced by, for example, microprocessor unit (MPU).

According to an aspect of the present invention, load on a processor that controls a cache memory is reduced.

According to another aspect of the present invention, information related only to read requests that are delayed is transmitted thereby reducing the traffic.

According to still another aspect of the present invention, a warning message is sent to the read request sending source so that it does not send subsequent read requests thereby further reducing the traffic.

According to still another aspect of the present invention, an error message is sent to a read request sending source so that only then the read request sending source starts an error process thereby reducing processing load.

According to still another aspect of the present invention, a cause of delay can be effectively identified by referring to information stored in a data relay device.

According to still another aspect of the present invention, state of delay in responding to each of the read requests can be clearly stored therein.

According to still another aspect of the present invention, elapsed time of each of the read requests can be effectively monitored.

According to still another aspect of the present invention, read response corresponding to the read request that is already processed is not relayed, and occurrence of error of receiving unexpected read response can be prevented.

According to still another aspect of the present invention, occurrence of error of receiving unexpected read response can be prevented with certainty.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data relay device that relays a read request from a source device to a destination device and relays a read response corresponding to the read request from the destination device to the source device, the data relay device comprising:
   a relay unit that receives a read request from the source device and relays the read request to the destination device;
   a counting unit that counts elapsed time from a time point at which the relay unit relays the read request to the destination device;
   a monitoring unit that monitors whether the elapsed time has reached a first threshold and a second threshold greater than the first threshold;
   an informing unit that sends a warning message to cause the source device to restrain from sending another read request upon result of monitoring by the monitoring unit indicating that the elapsed time has reached the first threshold without a read response corresponding to the read request relayed;
   a receiving unit that receives the read response corresponding to the read request relayed after the informing unit sends the warning message; and
   a discarding unit that discards the read response received by the receiving unit upon result of monitoring by the monitoring unit indicating that the elapsed time has reached the second threshold.

2. The data relay device according to claim 1, wherein the counting unit suspends counting of the elapsed time upon the receiving unit receiving the read response.

3. The data relay device according to claim 1, wherein the first threshold is shorter than a period of time judged as a time-out error in the source device.

4. The data relay device according to claim 1, wherein the monitoring unit monitors whether the elapsed time has reached the second threshold that is equivalent to a period of time judged as a time-out error in the source device.

5. The data relay device according to claim 1, further comprising a storing unit that separately stores therein a read request with elapsed time that has reached the second threshold and a read request with elapsed time that has not reached the second threshold.

6. The data relay device according to claim 5, wherein the storing unit stores therein identification information for identifying the read request with elapsed time that has reached the first threshold, flag information indicating whether data is received in response to the read request, time required for the source device to receive the data, and a type of delay corresponding to amount of delay in an associated manner.

7. The data relay device according to claim 1, further comprising a managing unit that manages identification information for identifying the read request, elapsed time, and flag information indicating whether there is any data in response to the read request.

8. A storage device that stores, in a storing medium, user data that is read by a host computer, the storage device comprising:
   a plurality of channel adapters each of which is capable of outputting a read request to read user data from the storing medium based on a command from the host computer;
   a switch that receives a read request from a first channel adapter from among the channel adapters and relays the read request; and
   a cache controller that receives the read request from the switch, reads user data corresponding to the read request from the storing medium, and sends the user data to the first channel adapter through the switch, wherein the switch includes
      a relay unit that receives the read request from the first channel adapter and relays the read request to the cache controller;
      a counting unit that counts elapsed time from a time point at which the relay unit relays the read request to the cache controller up to a time point at which data is received from the cache controller in response to the read request;
      a monitoring unit that monitors whether the elapsed time has reached a first threshold and a second threshold greater than the first threshold;
      an informing unit that sends a warning message to cause the first channel adapter to restrain from sending another read request upon result of monitoring by the monitoring unit indicating that the elapsed time has reached the first threshold without receiving the user data from the cache controller;
      a receiving unit that receives the user data from the cache controller after the informing unit sends the warning message; and
      a discarding unit that discards the user data received by the receiving unit upon result of monitoring by the monitoring unit indicating that the elapsed time has reached the second threshold.

9. A method of monitoring a delay in a response by a data relay device that relays a read request from a source device to a destination device and relays a read response corresponding to the read request from the destination device to the source device, the method comprising:
   receiving a read request from the source device and relaying the read request to the destination device;
   counting elapsed time from a time point at which the read request is relayed to the destination device;
   monitoring whether the elapsed time has reached a first threshold and a second threshold greater than the first threshold;
   sending a warning message to cause the source device to restrain from sending another read request when it is determined at the monitoring that the elapsed time has reached the first threshold without a read response corresponding to the read request relayed;

receiving the read response corresponding to the read request relayed after the warning message is sent; and discarding the read response received when it is determined at the monitoring that the elapsed time has reached the second threshold.

10. The method according to claim 9, further comprising: suspending counting of the elapsed time upon receiving the read response.

11. The method according to claim 9, wherein the first threshold is shorter than a period of time judged as a time-out error in the source device.

12. The method according to claim 9, wherein the monitoring includes monitoring whether the elapsed time has reached the second threshold that is equivalent to a period of time judged as a time-out error in the source device.

13. The method according to claim 9, further comprising separately storing in a storing unit a read request with elapsed time that has reached the second threshold and a read request with elapsed time that has not reached the second threshold.

14. The method according to claim 13, wherein the storing includes storing in the storing unit identification information for identifying the read request with elapsed time that has reached the first threshold, flag information indicating whether data is received in response to the read request, time required for the source device to receive the data, and a type of delay corresponding to amount of delay in an associated manner.

15. The method according to claim 9, further comprising managing identification information for identifying the read request, elapsed time, and flag information indicating whether there is any data in response to the read request.

* * * * *